United States Patent
Charbit et al.

(10) Patent No.: US 9,420,564 B2
(45) Date of Patent: Aug. 16, 2016

(54) APPARATUS AND METHOD FOR DYNAMIC COMMUNICATION RESOURCE ALLOCATION FOR DEVICE TO-DEVICE COMMUNICATIONS IN A WIRELESS COMMUNICATION SYSTEM

(75) Inventors: Gilles Charbit, Farnborough (GB); Tao Chen, Salo (FI); Sami-Jukka Hakola, Kempele (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 869 days.

(21) Appl. No.: 13/126,925

(22) PCT Filed: Oct. 29, 2009

(86) PCT No.: PCT/IB2009/007270
§ 371 (c)(1),
(2), (4) Date: Oct. 13, 2011

(87) PCT Pub. No.: WO2010/049801
PCT Pub. Date: May 6, 2010

(65) Prior Publication Data
US 2012/0093098 A1   Apr. 19, 2012

Related U.S. Application Data

(60) Provisional application No. 61/109,442, filed on Oct. 29, 2008.

(51) Int. Cl.
*H04W 72/04* (2009.01)
*H04W 88/08* (2009.01)
(Continued)

(52) U.S. Cl.
CPC ............ *H04W 72/04* (2013.01); *H04W 56/002* (2013.01); *H04W 88/08* (2013.01); *H04W 72/085* (2013.01); *H04W 76/00* (2013.01)

(58) Field of Classification Search
CPC ...... H04W 72/04; H04W 88/08; H04W 76/00
USPC .................................................. 370/329, 341
See application file for complete search history.

(56) References Cited

U.S. PATENT DOCUMENTS 6,415,146 B1 * 7/2002 Capece .......................... 455/517
7,035,240 B1 * 4/2006 Balakrishnan et al. ........ 370/338
(Continued)

FOREIGN PATENT DOCUMENTS

EP    1940189 A2   7/2008
EP    2012443 A2   1/2009
(Continued)

OTHER PUBLICATIONS

Office Action received for corresponding Korean Patent Applicaiton No. 2011-7012092, dated Jul. 31, 2012, 8 pages, with English Translation.
(Continued)

*Primary Examiner* — Kodzovi Acolatse
(74) *Attorney, Agent, or Firm* — Harrington & Smith

(57) ABSTRACT

An apparatus, system and method to dynamically manage an allocation of communication resources for direct device-to-device communications between a plurality of wireless communication devices in a wireless communication system. In one embodiment, the apparatus (410) includes a communication resource allocator (420) configured to: (1) select a master communication device of a plurality of wireless communication devices that form a device-to-device group, (2) provide an allocation of communication resources for device-to-device group that facilitate direct device-to-device communications therebetween. The apparatus (410) also includes a message generator (430) configured to assemble messages that include the allocation of the communication resources.

19 Claims, 5 Drawing Sheets

(51) Int. Cl.
*H04W 56/00* (2009.01)
*H04W 76/00* (2009.01)
*H04W 72/08* (2009.01)

(56) References Cited

U.S. PATENT DOCUMENTS

| | | | |
|---|---|---|---|
| 7,308,266 B2 | 12/2007 | Du et al. | |
| 7,333,824 B2 | 2/2008 | Zhang et al. | |
| 2002/0086678 A1 | 7/2002 | Salokannel et al. | |
| 2003/0144003 A1 | 7/2003 | Ranta et al. | |
| 2005/0239451 A1 | 10/2005 | Periyalwar et al. | |
| 2006/0178148 A1* | 8/2006 | Du et al. | 455/445 |
| 2007/0047510 A1* | 3/2007 | Cho et al. | 370/338 |
| 2007/0104123 A1 | 5/2007 | Tomici et al. | |
| 2007/0109989 A1 | 5/2007 | Nakagawa et al. | |
| 2008/0159217 A1 | 7/2008 | Chang et al. | |
| 2008/0186895 A1* | 8/2008 | Shang et al. | 370/312 |
| 2009/0034432 A1* | 2/2009 | Bonta et al. | 370/255 |
| 2009/0325625 A1 | 12/2009 | Hugl et al. | |
| 2011/0312331 A1 | 12/2011 | Hakola et al. | |

FOREIGN PATENT DOCUMENTS

| | | |
|---|---|---|
| KR | 2006-0098360 A | 9/2006 |
| WO | WO-0162026 A1 | 8/2001 |
| WO | 2005/060182 A1 | 6/2005 |
| WO | 2006/067683 A2 | 6/2006 |
| WO | WO-2006/136992 A2 | 12/2006 |
| WO | 2007/034428 A2 | 3/2007 |
| WO | 2009044335 A1 | 4/2009 |
| WO | 2010028690 A1 | 3/2010 |
| WO | 2010049801 A1 | 5/2010 |

OTHER PUBLICATIONS

Office Action received for corresponding Chinese Patent Applicaiton No. 200980149855.8, dated May 31, 2013, 18 pages, with English Translation.

Lee et al., "Cluster-Based Multi-Channel Scheduling Algorithms for Ad Hoc Networks", the 4th IEEE and IFIP International Conference on Wireless and Optical Communications Networks, Jul. 2-4, 2007, 5 pages.

Office Action reveived for corresponding U.S. Appl. No. 12/818,705, dated Aug. 6, 2012, 22 pages.

International Search Report and Written Opinion, received in corresponding Patent Cooperation Treaty Application No. PCT/IB2011/052143, dated Oct. 3, 2011, 11 pages.

Hyukjin, Lee, "Cluster-Based Multi-Channel Scheduling Algorithms for Ad Hoc Networks", Wireless and Optical Communications Networks, 2007. WOCN '07. IFIP International Conference on, pp. 1-5, Jul. 2-4, 2007.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, v1.0.0, Mar. 2007, pp. 1-82.

Office Action received for corresponding Korean Patent Application No. 2011-7012092, dated Jul. 31, 2012, 4 pages, No English Language Translation available.

International Search Report and Written Opinion received for corresponding Patent Cooperation Treaty Application No. PCT/IB2009/007270, dated Feb. 16, 2010, 13 pages.

Office action received for corresponding Chinese Patent Application No. 200980149855.8, dated Dec. 9, 2013, 4 pages of office action and 3 pages of office action translation.

* cited by examiner

APPARATUS AND METHOD FOR DYNAMIC COMMUNICATION RESOURCE ALLOCATION FOR DEVICE TO-DEVICE COMMUNICATIONS IN A WIRELESS COMMUNICATION SYSTEM

RELATED APPLICATION

This application was originally filed as PCT Application No. PCT/IB2009/007270 filed on Oct. 29, 2009 and claims priority to U.S. Provisional Application No. 61/109,442 filed Oct. 29, 2008, which is incorporated herein by reference in its entirety.

This application claims the benefit of U.S. Provisional Application No. 61/109,442 entitled "Apparatus and Method for Dynamic Communication Resource Allocation for Device-To-Device Communications in a Wireless Communication System," filed on Oct. 29, 2008, which is incorporated herein by reference.

TECHNICAL FIELD

The present invention is directed, in general, to management of communication resources in a wireless communication system and, in particular, to the management of an allocation of communication resources for direct device-to-device communications between a plurality of wireless communication devices in a wireless communication system.

BACKGROUND

LTE, or Long Term Evolution, also referred to as 3G, refers to research and development involving the third generation partnership project ("3GPP"), which is the name generally used to describe an ongoing effort across the industry aimed at identifying technologies and capabilities that can improve systems such as the universal mobile telecommunications system ("UMTS"). The goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS.

The evolved universal terrestrial radio access network ("E-UTRAN") in 3GPP includes base stations, providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices such as cellular telephones, mobile stations, etc. A wireless communication device is also generally known as user equipment ("UE"). A base station is an entity of a communication network often referred to as a Node B or an NB. Particularly in the E-UTRAN, an "evolved" base station is referred to as an eNB. For details about the overall architecture of the E-UTRAN, see 3GPP Technical Specification ("TS") 36.300 v1.0.0 (March 2007), which is incorporated herein by reference.

As wireless communication systems such as cellular telephone, satellite, and microwave communication systems become widely deployed and continue to attract a growing number of users, there is a pressing need to accommodate a large and variable number of communication devices transmitting a growing volume of data with fixed resources. Traditional communication system designs employing a fixed communication resource (e.g., a fixed data rate for each communication device) have become challenged to provide high, but flexible, data transmission rates in view of the rapidly growing customer base and expanding levels of service.

A conventional communication mode in a cellular communication system utilizes a base station to establish and control communications between wireless communication devices such as mobile stations carried by subscribers. Accordingly, a base station acts as an intermediary relay link between the wireless communication devices. In this conventional communication mode, each wireless communication device communicates with another wireless communication device employing communication paths between each communication device and the base station (i.e., each wireless communication device indirectly communicates with the other wireless communication device). A more efficient communication mode enables a direct communication path or link between wireless communication devices. Such a direct communication path or link, referred to as a device-to-device ("D2D") communication path or link, requires granting of communication resources to the directly communicating wireless communication devices.

A grant of communication resources for D2D communications, however, can significantly increase signaling overhead if done in a centralized manner by a base station such as an eNB. One way to reduce the overhead is to allocate communication resources in a fixed manner for all communication devices requesting a D2D connection. A persistent communication resource allocation is spectrally inefficient, as the need for communication resources by communication devices may vary over time such as for discontinuous transmission during a quiet period of a voice call, for a bursty type of packet transmission during gaming, or for instant messaging, etc. Moreover, a fixed communication resource allocation is not adaptive to accommodate network load variations or variations in communication path characteristics. For example, when new services are established or when services are completed from time to time, the system may need to reconfigure frequency or time slot resources, or may need to reallocate existing services to improve spectral utilization. Hence, there is a need to allocate communication resources for D2D communication in a dynamic fashion, but at the same time provide flexibility of communication resource allocation with a reduced impact on base station signaling overhead. These issues are particularly important in time division duplex ("TDD") communication systems because various transmit/receive traffic slot configurations can significantly increase signaling overhead.

There have been attempts in the past to address peer-to-peer ("P2P") communications between user equipment in a communication system. For instance, International Patent Application Publication No. WO 2006/067683, entitled "Method and Apparatus for Eliminating P2P Interference in P2P-Enabled Communication Systems," by D. Shang, et al., published Jun. 29, 2006, which is incorporated herein by reference, describes a method for an initial resource allocation for P2P communication between user equipment, but no description is provided for efficient utilization of these communication resources.

Therefore, what is needed in the art is a system and method that provides efficient and dynamic management of communication resources in a wireless communication system that avoids the deficiencies of conventional systems.

SUMMARY OF THE INVENTION

These and other problems are generally solved or circumvented, and technical advantages are generally achieved, by embodiments of the present invention, which include a method, apparatus, and system to dynamically manage an allocation of communication resources for direct device-to-device communications between a plurality of wireless communication devices in a wireless communication system. In one embodiment, the apparatus includes an apparatus (e.g., a controller) including a communication resource allocator configured to: (1) select a master communication device of a plurality of wireless communication devices that form a device-to-device group, (2) provide an allocation of communication resources for a device-to-device group that facilitate direct device-to-device communications therebetween. The apparatus also includes a message generator configured to assemble messages that include the allocation of the communication resources.

In another embodiment, the present invention provides an apparatus (e.g., a controller) employable with a master communication device of a plurality of wireless communication devices that form a device-to-device group. The apparatus includes a communication resource allocator configured to (1) provide an allocation of communication resources for at least one device in said device-to-device group that facilitate direct device-to-device communications therebetween. The apparatus also includes a message generator configured to assemble messages that include the allocation of the communication resources.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

Figure 1:
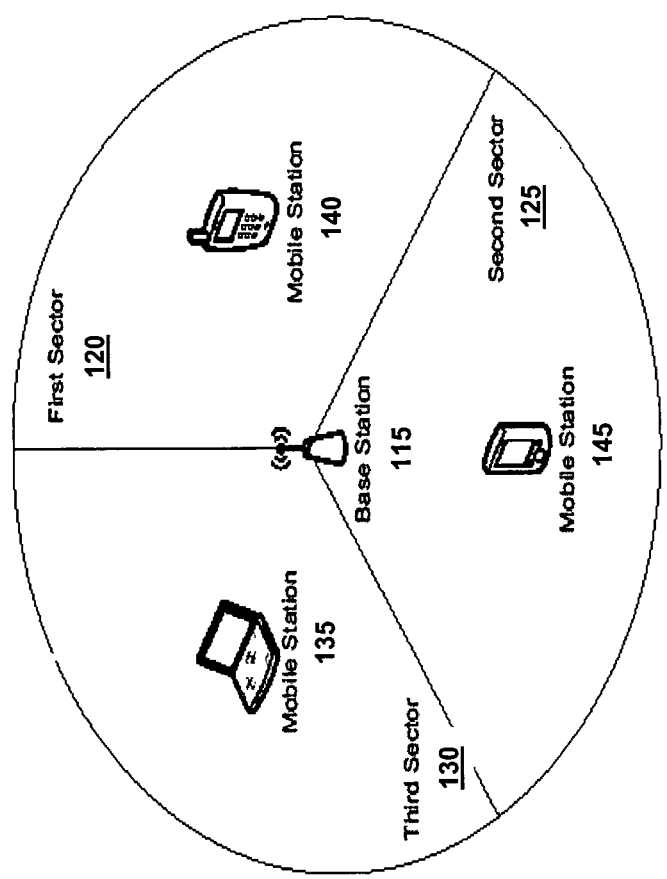
FIG. 1 illustrates a system level diagram of an embodiment of a communication system including a base station and wireless communication devices that provides an environment for application of the principles of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The invention is related to direct device-to-device ("D2D"), mobile-to-mobile ("M2M"), terminal-to-terminal ("T2T"), peer-to-peer ("P2P") communication modes integrated into a communication system including, without limitation, a cellular network such as a LTE/LTE-Advanced ("LTE-A") cellular network as specified in the 3GPP. Integration of the communication modes results in groups of wireless communication devices (e.g., mobile stations, terminals, peers, or machines) having a direct communication path or link therebetween while using the radio resources of an overlying communication network such as a cellular network. In this manner, communication resources are shared by D2D communication devices with other simultaneously operating communication devices having a normal connection to a base station such as an eNB.

An aspect of the invention is particularly related to a communication system operating in a frequency division duplex ("FDD") mode in which D2D connections utilize time division duplex ("TDD") mode, using either communication network uplink ("UL") or downlink ("DL") communication resources, or a combination of uplink and downlink communication resources controlled by a base station(s). The general concept of using communication systems wherein direct communication connections among communication devices using either FDD or TDD is described in International Patent Application Publication No. WO 2005/060182, entitled "Cellular Communications System," by S. McLaughlin, et al., published Jun. 30, 2005, which is incorporated herein by reference. A further description of the use of P2P communications in a communication system, particularly in a time division duplex-code division multiple access/time division duplex-synchronous code division multiple access ("TDD-CDMA/TD-SCDMA") is described in U.S. Pat. No. 7,308, 266, entitled "Method and System for Peer-to-Peer Communication Management in Wireless Communication Networks," by Y. Du, et al., issued Dec. 11, 2007, which is incorporated herein by reference. Also, in U.S. Pat. No. 7,333, 824, entitled "Method and Apparatus for Supporting P2P Communication in TDD CDMA Communication Systems," by X. Zhang, et al., issued Feb. 19, 2008, which is incorporated herein by reference, a base station manages interference with other user equipment from P2P pairs in a cell, but does not describe efficient utilization of assigned P2P communication resources.

A communication system that provides direct communication among wireless communication devices such as mobile stations in a wireless communication system introduces an opportunity to reduce transmitter power consumption both in the communication devices and in a base station, to increase communication network capacity, and to establish further services and economies for wireless communication devices. As introduced herein, dynamic communication resource allocation and sharing network radio communication resources is provided for wireless communication devices having capability for a direct D2D connection in a TDD communication mode.

Turning now to FIG. 1, illustrated is a system level diagram of an embodiment of a communication system including a base station 115 and wireless communication devices 135, 140, 145 that provides an environment for application of the principles of the present invention. The base station 115 is coupled with a public switched telephone network (not shown). The base station 115 is configured with a plurality of antennas to transmit and receive signals in a plurality of sectors including a first sector 120, a second sector 125, and a third sector 130, each of which typically spans 120 degrees. The sectors are formed by focusing and phasing the radiated and received signals from the base station antennas. The plurality of sectors increases the number of subscriber stations (e.g., the wireless communication devices 135, 140, 145) that can simultaneously communicate with the base station 115 without the need to increase the utilized bandwidth by reduction of interference that results from focusing and phasing base station antennas. The radiated and received frequencies utilized by the communication system illustrated in FIG. 1 would typically be two (2) gigahertz to provide non-line-of-sight communication.

Figure 2:
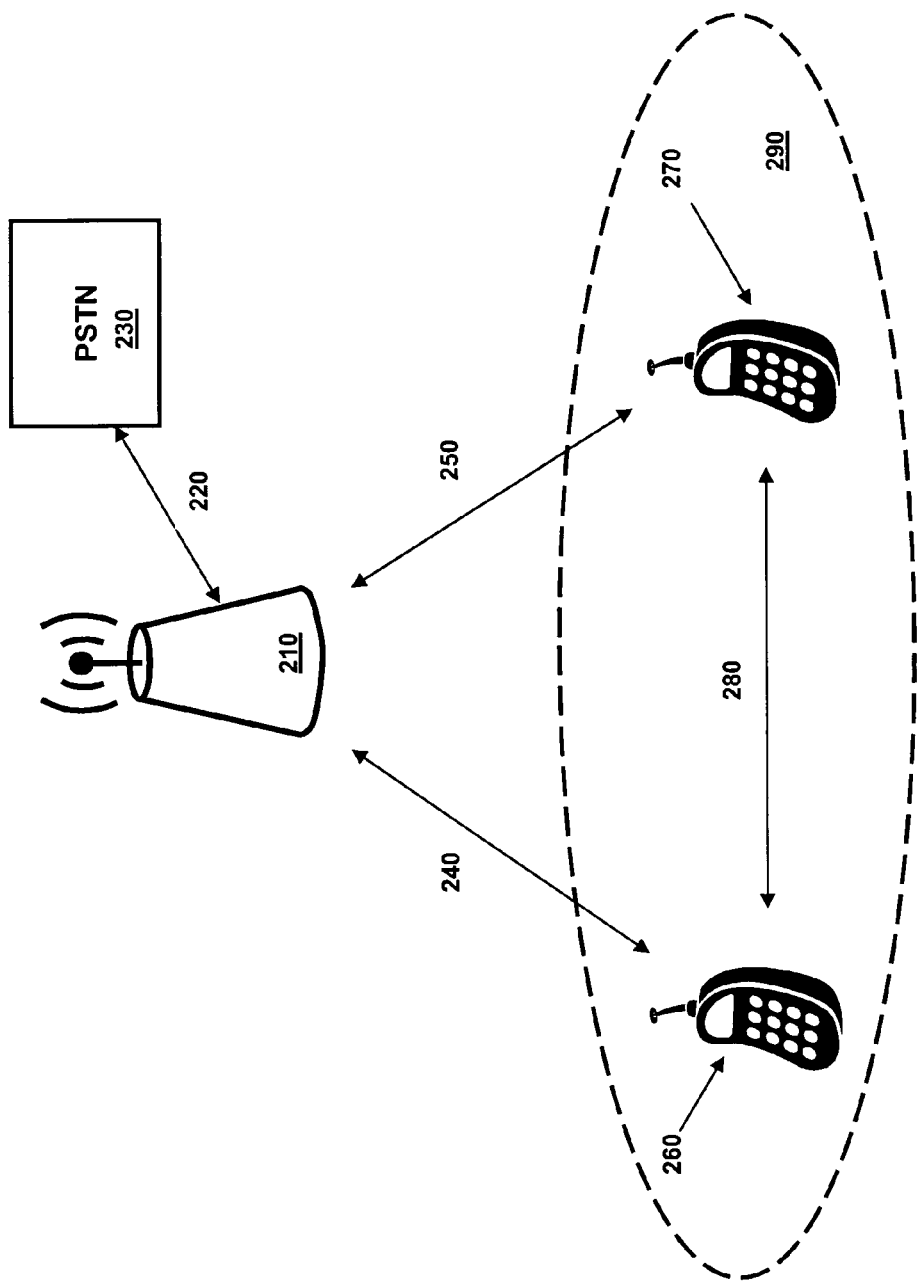
FIG. 2 illustrates a system level diagram of an embodiment of a communication system including wireless communication devices that provides an environment for application of the principles of the present invention.

Turning now to FIG. 2, illustrated is a system level diagram of an embodiment of a communication system including wireless communication devices that provides an environment for application of the principles of the present invention. The communication system includes a base station 210 coupled by a communication path or link 220 (e.g., by a fiber-optic communication path) to a core telecommunications network such as public switched telephone network ("PSTN") 230. The base station 210 is coupled by wireless communication paths or links 240, 250 to wireless communication devices 260, 270, respectively.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in FDD and TDD communication modes.

As introduced herein, the base station 210 can establish a D2D group, such as D2D group 290 including the wireless communication devices 260, 270, wherein a communication resource is allocated thereto to accommodate direct communication paths or links 280 therebetween. The communication paths or links 280 can include control and data resources. The base station 210 can select one of the wireless communication devices, such as wireless communication device 260, to operate as master communication device in the group. The other wireless communication device, wireless communication device 270, operates as a slave communication device in the group. Quality of service or another characteristic of these communication paths or links 280 is continually assessed, for example, periodically assessed by the base station 210 to dynamically reallocate communication resources for the wireless communication devices 260, 270. The quality of service or the another characteristic can be continually assessed by the base station 210 by one of the wireless communication devices 260, 270 in the D2D group 290, or elsewhere within a communication area of the base station 210 or of a nearby base station. For example and without limitation, the base station 210 can estimate distances of wireless communication devices 260, 270 in the group to other wireless communication devices that may lie within the cellular communication area of the base station 210 or may lie within the cellular communication area of another base station to assess the potential for interfering communication resources allocated to another wireless communication device in view of allocated communication resources.

Figure 3:
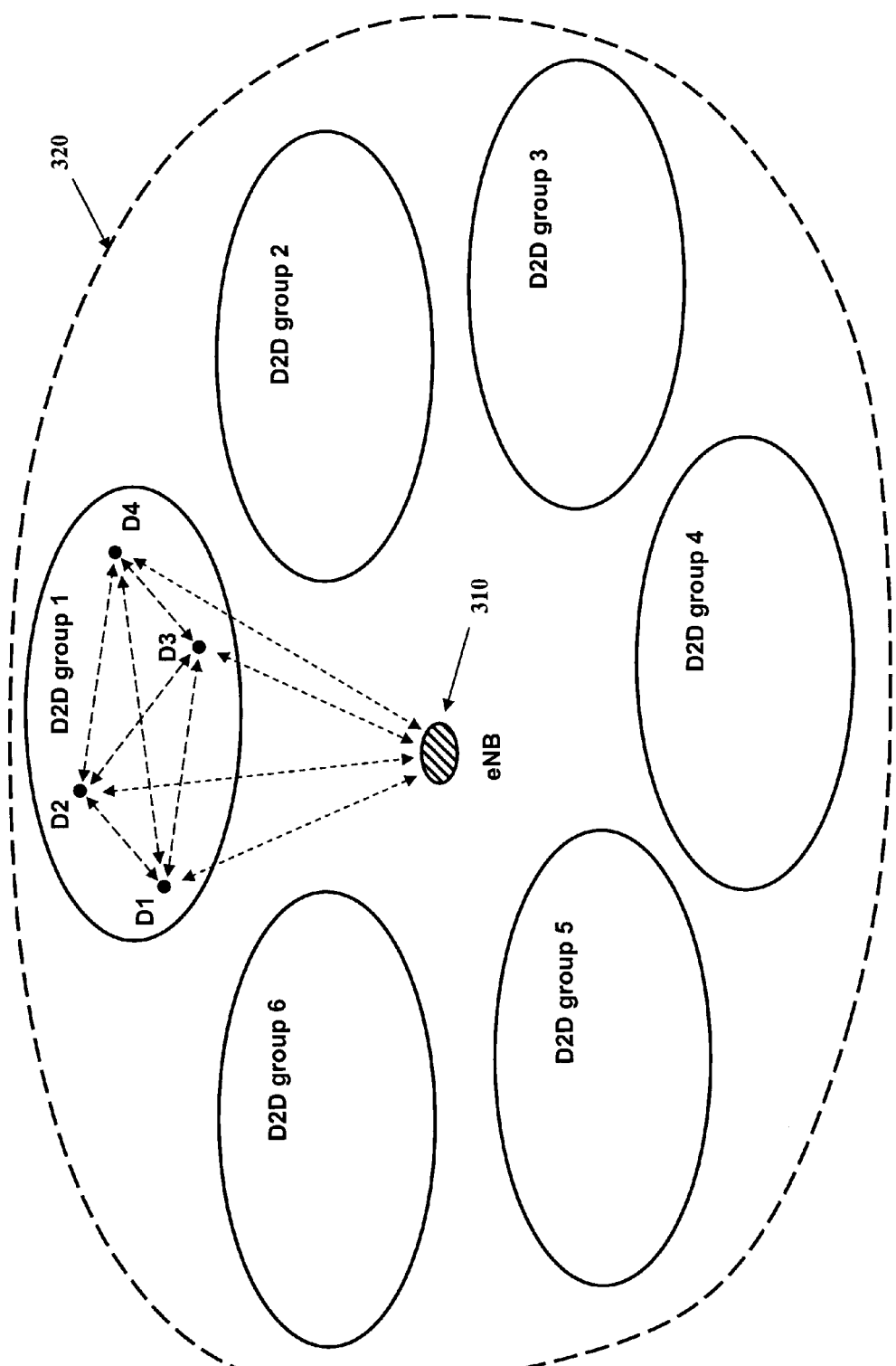
FIG. 3 illustrates a system level diagram of an embodiment of a base station communicating with wireless communication devices within a communication system in accordance with the principles of the present invention.

Turning now to FIG. 3, illustrated is a system level diagram of an embodiment of a base station 310 communicating with wireless communication devices within a cellular communication area 320 of a communication system in accordance with the principles of the present invention. In this example, six D2D groups are shown lying within the cellular communication area 320 of the base station (designated "eNB") 310. The wireless communication devices such as communication devices D1, D2, D3, D4 are grouped into D2D groups such as D2D group 1. D2D groups 1 and 4, being substantially physically separated, may use a same subset of physical resource blocks ("PRBs"). D2D groups 2 and 5, also being substantially physically separated, may use a same subset of physical resource block, but a subset different from the subset used by D2D groups 1 and 4. Similarly, D2D groups 3 and 6 may use a same subset of physical resource blocks, but a subset different from those used by the other D2D groups in the communication area 320. This allows "spatial reuse 3" of D2D communication resources in that three separated groups use a common communication resource. This assumes that typical D2D transmissions are for short range distances and, hence, are operable at low transmitter power levels. This example can be generalized to a multi-cell scenario wherein users are in different cells or sectors.

In general, the base station broadcasts the list of communication devices in a group to each communication device in the group. One communication device in each group may be designated by the base station to act as master communication device to manage D2D communication resources to allocate or release physical resource blocks for the other communication device pairs, which can be referred to as slave communication devices. The master communication device can also select and dynamically reselect the transmit/receive slot configuration to be followed by the communication devices in the group for normal TDD communication mode operations. The base station notifies the master and slave roles to the communication devices in the group. A D2D-capable communication device may be chosen as the master communication device by the base station based on any of various possible rules such as a distance of a communication device from the base station, a strongest link to the base station, a communication device already in a D2D active state wherein broadcasting and transmitting D2D signaling are already being performed. The master communication device responsibility can be rotated over time among communication devices or a subset of communication devices within a group to avoid excessive battery drain or to prevent one slave communication device suffering disproportionately from a relatively poor link to the master communication device. The communication devices in the group are notified by the base station of a new communication device being assigned to the group. In a further embodiment, lists of communication devices in neighboring groups can be identified to the communication devices in the group to allow inter-group D2D communication among communication devices from different or neighboring groups. To that end, master communication devices from neighboring groups may need to align their transmit/receive slot configurations for normal TDD communication modes. Various techniques may be employed for alignment of inter-group D2D communications.

As communication devices in a group are close geographically, the slave communication devices may be able to maintain synchronization with the master communication device and read D2D control signaling broadcasts by the master communication device. Allocation of the D2D communication resources to each communication device by the master communication device can be done employing fairness considerations depending on slave communication devices needs and the number of communication devices in the group. A base station need not be involved in allocating communication resources to communication devices within a group. Accordingly, allocation of communication resources can be done in a distributed manner. The role of the base station is to grant communication resources to a group of communication devices at any given time. The role of the master communication device is to grant these base station-assigned communication resources to the slave communication devices in the group. Various techniques may be employed to share D2D communication resources within a group.

One or more slave communication devices starting a D2D communication can request designation of a master communication device for communication resources. The amount of physical resource blocks allocated by a master communication device may be set according to fairness, priority, quality of service ("QoS"), etc., considerations. Each time a new communication device requests or releases a communication resource for D2D communications, the master communication device can change the allocation of communication resources for the slave communication devices in the group. This enables dynamic allocation of communication resources for the slave communication devices. The master communication device also participates in D2D communications and, in that sense, is allocated communication resources by itself following the same rules. A master communication device can also receive a command from a base station to provide communication resource information. For example, when cellular communication resources are released, a base station can send the updated D2D communication resource information to the master communication devices. Then, a master communication device can reconfigure or reallocate the communication resource within its own group. On the other hand, if more communication resources are needed, the base station may reallocate D2D communication resources for communication system use and notify master communication devices. If a master communication device is selected based on a shortest path loss to a base station, it can facilitate correct decoding of base station commands and power saving.

The master communication device and slave communication devices attempt to synchronize to each other. The master communication device broadcasts information about the synchronized slave communication devices on D2D physical broadcast channel ("P-BCH") to allow slave communication devices to be informed of neighboring communication devices in the same group. A slave communication device may then attempt to synchronize with another or with several slave communication devices by various synchronization techniques.

The transmit or receive timeslots for each communication device are also communicated by the master communication device and are the same for the communication devices in the group to allow TDD communication modes to reduce near-far interference. The switching point between transmit and receive timeslots may be varied dynamically. Within the group, one or several communication devices may receive D2D packets on a D2D physical downlink shared channel ("D2D PDSCH") or transmit D2D packets on a D2D physical uplink shared channel ("D2D PUSCH") at the same time. The signal transmissions may be sufficiently spatially separated or another methodology of providing noninterference or orthogonality may be considered (e.g., separation in the frequency domain by allocating a different subset of sub-carriers for each transmitting communication device). Depending on spatial reuse rules set by the base station, a communication device in a group may synchronize and communicate with another communication device in a neighboring group. The process for D2D synchronization can be established by various synchronization techniques such as by selection of a particular carrier modulation scheme.

The master communication device and slave communication devices typically form a resource group in the control plane. In the control plane, resource management includes three components, namely, base station operations, controlling of the master communication device, and D2D pairing. The base station semi-statically informs the master communication device about the available group communication resources with updates from time to time. The master communication device semi-statically allocates the communication resources within the group with updates from time to time, since the pairs in the group share the same group communication resources. A D2D pair dynamically chooses a different modulation coding scheme ("MCS") (and switching point in a TDD case) by using an allocated frequency communication resource in a distributed fashion. Another methodology of information sharing could be employed in the user plane (i.e., in the service group).

In the user plane, a service master communication device could be considered. This may not be the same as a controlling master communication device in the control plane. The service master communication device would share communication resource information with others in the D2D group. A service group may include one or more resource groups in the same cell or sector across several cells or sectors. This is an architecture design principle (i.e., the service is independent of the access technology). For example, if two communication devices are in a different group in the cell or are in different cells or sectors, a process can be constructed to choose a master communication device for communication resource scheduling.

In the case where a group master is not employed to schedule D2D communication resources for communication devices in a group, the base station itself may schedule these communication resources. For example, separate configuration and scheduling commands to user equipment could be sent by the base station using LTE Release 8 control signaling as in any connection between the communication devices. FDD UL and FDD DL communication resources can be used for data transmission and control signaling. Communications between the communication devices will then be as in LTE R8, once the base station assigns the communication devices to communicate using a cellular access mode. In another example, common scheduling commands to wireless communication devices (i.e. a command to a D2D pair) could be sent by the base station using a new D2D configuration on the physical downlink control channel ("PDCCH"). This option can be readily described with further specification.

Communication device(s) engaged in D2D communication with another communication device in the group may send acknowledge/non-acknowledge ("ACK/NACK") signals to the another communication device for the received packet in a distributed fashion (without base station or master communication device signaling support) and a hybrid automatic retransmit request ("HARQ") process may proceed. Adaptive modulation and coding ("AMC") may be carried out based on a NACK rate or another metric (e.g., a receive signal measurement, etc.). A D2D power transmission is performed within an upper limit of a D2D transmitter power level set by the base station at any given time, or possibly a lower limit based on D2D traffic. A communication device may set its own power transmitter level dynamically within given power limits to achieve reliable transmission. This is a form of distributed transmitter power control with upper transmitter power levels set by a base station or by a master communication device. The D2D signaling to support D2D HARQ, AMC, and power control operations can be structured according to various design techniques. There is no need for communication devices engaged in D2D communications to send an ACK/NACK message to a base station on the physical uplink control channel ("PUCCH"), or for the base station to forward ACK/NACK to the communication device on the physical hybrid automatic retransmit request indicator channel ("PHICH"). Likewise, transmission format, modulation and coding need not be indicated on the physical downlink control channel ("PDCCH") (on a downlink) or the PUCCH (on an uplink). As disclosed herein, the communication devices use D2D communication resources for D2D signaling in a more efficient way, as spatial reuse of these communication resources may be possible. This saves signaling on a direct communication device-to-base station path or link, as signals on the PDCCH, PHICH (on a downlink) and PUCCH (on an uplink) are transmitted across the whole cell or sector, and spatial reuse is not typically in use.

Figure 4:
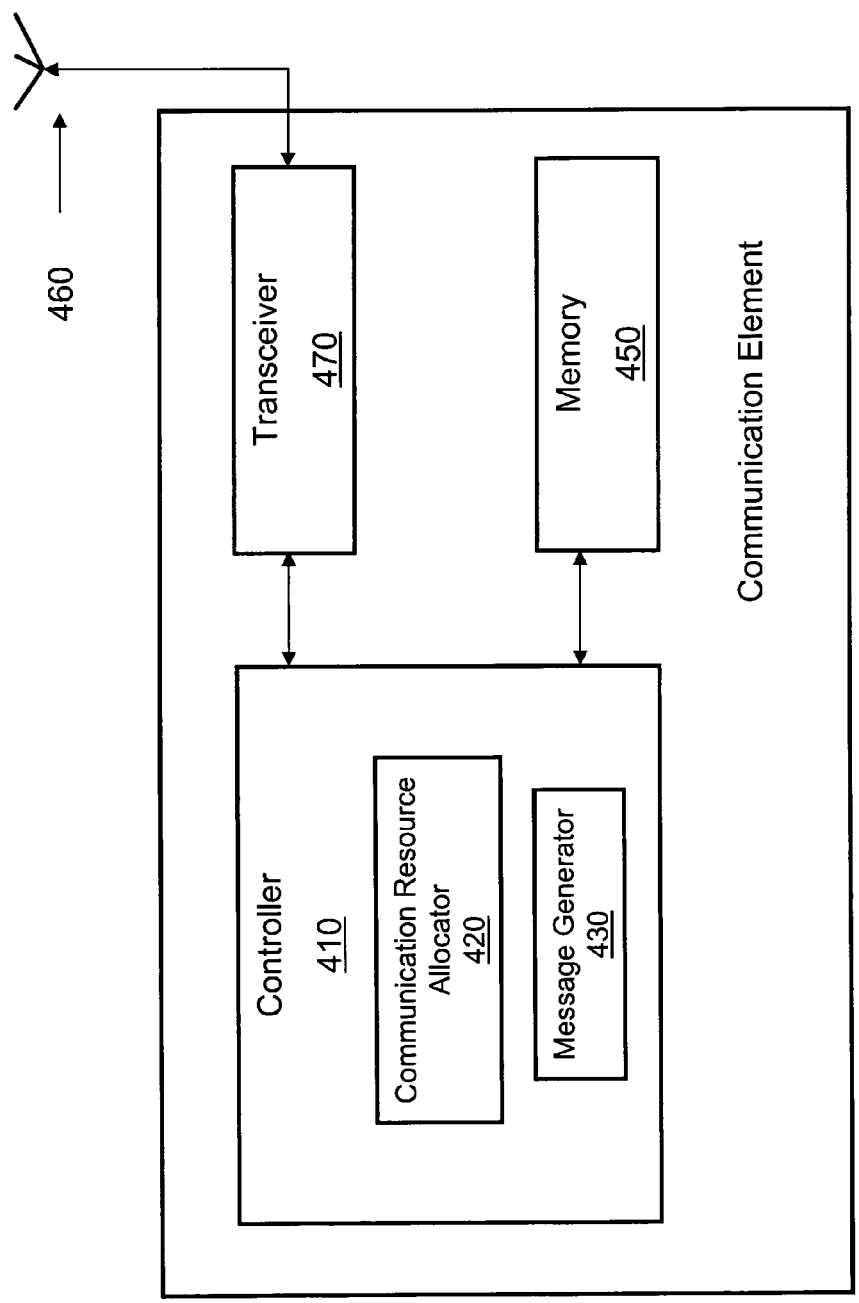
FIG. 4 illustrates a block diagram of an embodiment of a communication element of a wireless communication system that provides an environment for application of the principles of the present invention.

Turning now to FIG. 4, illustrated is a block diagram of an embodiment of a communication element of a wireless communication system that provides an environment for application of the principles of the present invention. The wireless communication system may include, for example, a cellular network. The communication element may represent, without limitation, a base station, a subscriber station (such as a wireless communication device), a network control element, or the like.

The communication element includes a controller 410, memory 450 that stores programs and data of a temporary or more permanent nature, an antenna 460, and a radio frequency transceiver 470 coupled to the antenna 460 and the controller 410 for bidirectional wireless communications. The communication element may provide point-to-point and/or point-to-multipoint communication services.

The communication element may be coupled to a communication network element, such as a network control element of a public switched telecommunication network. A network control element generally provides access to a core communication network such as a public switched telecommunication network ("PSTN"). Access to the communication network may be provided in fixed facilities, such as a base station, using fiber optic, coaxial, twisted pair, microwave communication, or similar link coupled to an appropriate link-terminating element (not shown). A communication element formed as a wireless communication device such as a mobile station is generally a self-contained communication device intended to be carried by an end user.

The controller 410 in the communication element, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and equipment, configuration management, end user administration, management of subscriber stations, management of tariff, subscription, and security, and the like. The execution of all or portions of particular functions or processes related to management of resources may be performed in equipment separate from and/or coupled to the communication element, with the results of such functions or processes communicated for execution to the communication element. The controller 410 of the communication element may be of any type suitable to the local application environment, and may include one or more of general-purpose computers, special-purpose computers, microprocessors, digital signal processors ("DSPs"), and processors based on a multi-core processor architecture, as non-limiting examples.

In accordance with the memory 450, the controller 410 includes a communication resource allocator 420 configured to provide an allocation of communication resources to facilitate direct device-to-device communications between wireless communication devices. The communication resources include information to synchronize the wireless communication devices that form a device-to-device group, wherein one of the wireless communication devices may operate as a master communication device. The controller 410 may assess an operating characteristic of the direct device-to-device communications to enable the communication resource allocator 420 to reallocate the communication resources. A message generator 430 of the controller assembles messages that include an allocation and reallocation of the communication resources for transmission by the transceiver 470.

The communication resource allocator 420 may also partition a sequence of subcarriers or time slots into physical resource blocks, aggregate the physical resource blocks into resource groups (e.g., of uniform size), permute the resource groups based on physical resource blocks, form channels by selecting resource blocks from the permuted resource groups, and select a group of the channels to form a communication resource allocation. Again, the message generator 430 assembles a message carrying the information about the communication resource allocation and channelization for transmission by the transceiver 470. In performing the communication resource allocation as described herein, the communication resource allocator 420 and controller 410, in general, performs the functions as described herein as a part of a wireless communication device (e.g., a master wireless communication device), a base station or other network entity.

The transceiver 470 of the communication element modulates information onto a carrier waveform for transmission by the communication element via the antenna 460 to another communication element. The transceiver 470 demodulates information received via the antenna 460 for further processing by other communication elements.

The memory 450 of the communication element, as introduced above, may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 450 may include program instructions that, when executed by an associated processor, enable the communication element to perform tasks as described herein. Exemplary embodiments of the system, subsystems and modules as described herein may be implemented, at least in part, by computer software executable by processors of, for instance, the mobile station and the base station, or by hardware, or by combinations thereof. As will become more apparent, systems, subsystems and modules may be embodied in the communication element as illustrated and described above.

Figure 5:
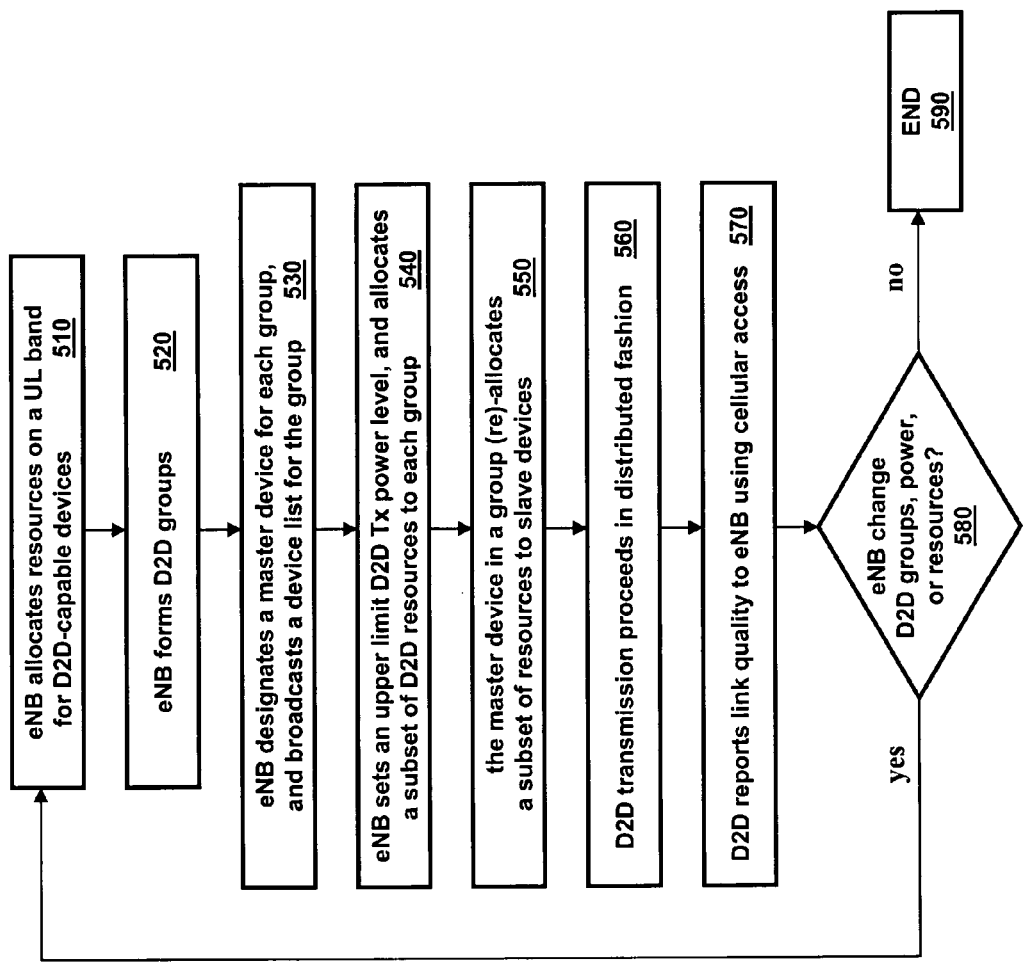
FIG. 5 illustrates a flow chart demonstrating an embodiment of a method of operating a communication system in accordance with the principles of the present invention.

Turning now to FIG. 5, illustrated is a flow chart demonstrating an embodiment of a method of operating a communication system in accordance with the principles of the present invention. A plurality of wireless communication devices operate on a paired band in an FDD communication mode for transmission to a base station in an uplink, and reception from the base station in a downlink. The D2D communication path or link uses dedicated spectrum on an uplink band in a TDD communication mode. A base station assigns communication resources to the wireless communication devices having D2D connection employing time and frequency communication resources on an uplink band (e.g., via physical resource blocks ("PRBs")). During a step 510, a base station initially allocates communication resources on an uplink band for wireless communication devices such as D2D-capable communication devices. During a step 520, the base station forms D2D groups and then, at a step 530, the base station designates a master communication device for each group and broadcasts a communication device list for the group. During a step 540, the base station sets an upper limit D2D transmit power level, and allocates a subset of D2D-available communication resources to each group. During a step 550, the master communication device in a group reallocates a subset of the communication resources to the other communication devices (e.g., the slave communication devices in the group). During a step 560, D2D transmission proceeds in a distributed fashion and then, at a step 570, D2D reports provide quality data to the base station using a communication resource such as a cellular access resource. At a decisional step 580, the base station examines the need to change D2D grouping, transmit power level, or other communication resources. If the base station determines that there is a need to change D2D resources or grouping, the base station allocates further communication resources or grouping for D2D-capable communication devices, as indicated by the path returning to the step 510, otherwise the procedure ends at a step 590.

A base station allocates and reallocates dedicated communication resources for D2D communication from time to time for each communication device or group of communication devices, and sets upper limit D2D transmitter power levels. The grouping of communication devices that are within direct communication range of each other (i.e., assigning a direct communication mode for closely spaced wireless communication devices intending communication with each other) is an advantageous solution for low-powered D2D transmission. To improve spectral efficiency, dedicated physical resource blocks may be reused at the same time by another communication device or by a group of communication devices sufficiently distant, that they do not cause significant interference between actively communicating devices, thereby providing spatial reuse of a communication resource.

A base station assigns D2D communication resources and transmitter power settings in a dynamic way that depends on D2D and communication device-to-base station traffic loads. Communication devices actively engaging in D2D communication remain attached in synchronization, in communication resource updates such as cell updates, and during handovers between base stations. A base station assigns each communication device to a group of communication devices that may directly synchronize and communicate with each other. Communication devices within a group may self-regulate their D2D transmission power level to achieve reliable communication in an efficient way to reduce D2D interference with communication devices in other groups sharing analogous communication resources.

Communication devices within a group may decide among themselves how to use base station assigned communication resources in a distributed and dynamical manner (e.g., a transmit/receive slot configuration, a link adaptation ("LA"), adaptive modulation and coding ("AMC"), and hybrid automatic retransmit request ("HARQ") retransmissions). For example and without limitation, wireless communication devices within a group may decide to modify a coding arrangement, such as by modifying puncturing of a coded word. The base station may designate a wireless communication device in the group to act as the master communication device to dynamically manage grant signaling for slave communication devices in the group and the transmit/receive slot(s) (e.g., time slot(s)) configuration for all communication devices in the group to enable TDD communication mode operations. This arrangement allows slave communication devices to share dedicated physical resource blocks for D2D communication, and to determine when a slave communication device can be in a transmit mode or in a receive mode. Alternatively, a base station can grant D2D communication resources for a pair of communication devices at any given time in a centralized way.

The wireless communication devices operating in D2D communications can report interference received on assigned communication resources to the base station using control-signaling resources in communication network access such as cellular access employing assigned or random access communication resources. This allows the base station to control spatially reused resources by granting lower or higher transmitter power between D2D communication devices in a group. The construction of various D2D communication path or link quality reports to a base station can be adapted to the circumstances of a particular application.

A base station may arrange communication devices into a group based on their physical separation and communication characteristics such as the presence or absence of an intervening communication obstruction. Arranging of communication devices into a group can be determined in a number of ways such as according to communication devices that lie in a same antenna sector, communication devices that have similar timing advance ("TA") parameter values, and rough direction of arrival ("DoA") estimation may be performed at the base station using multi-antenna processing capability, etc. A communication resource may be reused among groups by dynamic resource assignment depending on group separation or changes therein.

Thus, as introduced herein, as D2D communication resource allocation is performed in a distributed fashion with reduced base station signaling, delays for D2D communications should be substantially reduced. Distributed D2D communication resource allocation and packet scheduling reduces the impact of communication device-to-base station signaling, and may result in smaller delays. Additionally, low-power D2D connections in a communication system enable a relatively lower level of interference by not requiring potentially high-power transmission to or from a base station. The D2D communication enhancements described hereinabove call for specification support for consistency for the control signaling. The impact on standardization or otherwise could be reasonable if D2D communication resource scheduling and link adaptation is done in distributed fashion employing the master communication device concept introduced herein. A system is provided for use in an entity of a communication system to respond to a request for allocation of communication resources from a communication device connected to the entity. The entity includes a controller for uplink transmission communication resource allocations for one or more wireless communication devices connected to the entity. A computer program product including instructions for granting a communication resource allocation to the wireless communication device may form and be a part of the system as described herein. The functions as described herein may be performed by a controller (including, for instance, a communication resource allocator) in a wireless communication device, base station, or other network entity.

In one embodiment, an apparatus (e.g., a controller that forms a part of a wireless communication device or base station) includes a communication resource allocator configured to provide communication resources to facilitate direct device-to-device communications between wireless communication devices, synchronize the wireless communication devices that form a device-to-device group, and assess an operating characteristic of the direct device-to-device communications (e.g., a separation distance between said wireless communication devices) to enable reallocation of the communication resources. The apparatus also includes a message generator configured to assemble messages that include the communication resources. The apparatus also includes a transceiver configured to transmit the messages including the communication resources to the wireless communication devices.

In an exemplary embodiment, the communication resource allocator is configured to make an allocation of the communication resources for the direct device-to-device communications between the wireless communication devices, wherein the allocation depends on an operating characteristic of the direct device-to-device communications. The communication resource allocator may also be configured to form the device-to-device group among the wireless communication devices. In accordance therewith, the communication resource allocator is also configured to select one of the wireless communication devices as a master communication device and another of the wireless communication devices as a slave communication device, and rotate a selection thereof over time. In another embodiment, the communication resource allocator is configured to periodically assess the operating characteristic and periodically reallocate the communication resources as a function thereof. Additionally, the communication resources may include an upper limit for transmitter power levels for the direct device-to-device communications, a time slot(s) in a time division duplex communication mode for the direct device-to-device communications, and a modulation or coding characteristic for the direct device-to-device communications.

In another embodiment, the communication resource allocator may form a portion of a master communication device in a group of communication devices to act as a group communication resource allocator to periodically assess an operating characteristic and periodically reallocate the communication resources to slave communication devices as a function thereof. Additionally, the communication resources may include an upper limit for transmitter power levels for direct device-to-device communications within the group of communication devices, a time slot(s) in a time division duplex communication mode for the direct device-to-device communications, and a modulation or coding characteristic for the direct device-to-device communications.

In addition, program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM ("EROM"), a floppy diskette, a compact disk CD-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   at least one processor; and
   at least one memory including computer program code
   the at least one memory and the computer program code configured to, with the at least one processor, cause the apparatus to perform at least the following:
   control a base station to select a master communication device of a plurality of wireless communication devices that form a device-to-device group and to designate the other devices forming the group as slave communication devices operating under conditions specified by the master communication device,
   control the base station to provide an allocation of data communication resources for said device-to-device group that facilitate direct device-to-device communications among the master communication device and the one or more slave communication devices of said plurality of wireless communication devices that form said device-to-device group, wherein the resources allocated to the device-to-device group are configured to be dynamically allocated by the master communication device at least by reallocating a subset of the resources among the master communication device, the one or more slave communication devices, or both; and control the base station to assemble and transmit messages that include said allocation of said communication resources.

2. The apparatus according to claim 1, wherein the at least one memory and the computer program code are further configured to, with the at least one processor, cause the apparatus to control the base station to periodically assess at least one operating characteristic of the device-to-device communication and periodically reallocate said communication resources as a function thereof.

3. The apparatus according to claim 2 wherein said operating characteristic includes separation distance between wireless devices belonging to said plurality of wireless communication devices.

4. The apparatus according to claim 1 wherein the at least one memory and the computer program code are further configured to, with the at least one processor, cause the apparatus to control the base station to rotate through said plurality of wireless communication devices that form said device-to-device group for selection of a member of the group as the master communication device.

5. The apparatus according to claim 1 wherein said apparatus further comprises a transmitter configured to transmit said messages including said allocation and reallocation of said communication resources.

6. The apparatus according to claim 1 wherein said communication resources are selected from:
 an upper limit for transmitter power levels for said direct device-to-device communications,
 a time slot in a time division duplex communication mode for said direct device-to-device communications,
 information to synchronize said plurality of wireless communication devices, and
 at least one of a modulation and coding characteristic for said direct device-to-device communications.

7. A non-transitory computer readable medium storing a program of instructions, execution of which by a processor configures an apparatus to at least:
 control a base station to select a master communication device of a plurality of wireless communication devices that form a device-to-device group and to designate the other devices forming the group as slave communication devices operating under conditions specified by the master communication device;
 control the base station to provide an allocation of data communication resources for said device-to-device group that facilitate direct device-to-device communications among the master communication device and the one or more slave communication devices of said plurality of wireless communication devices that form said device-to-device group, wherein the resources allocated to the device-to-device group are configured to be dynamically allocated by the master communication device at least by reallocating a subset of the resources among the master communication device, the one or more slave communication devices, or both; and
 control the base station to assemble and transmit messages that include said allocation of said communication resources.

8. A method, comprising:
 controlling a base station to select a master communication device of a plurality of wireless communication devices that form a device-to-device group and to designate the other devices forming the group as slave communication devices operating under conditions specified by the master communication device;
 controlling the base station to provide an allocation of data communication resources for said device-to-device group that facilitate direct device-to-device communications among the master communication device and the one or more slave communication devices of said plurality of wireless communication devices that form said device-to-device group, wherein the resources allocated to the device-to-device group are configured to be dynamically allocated by the master communication device at least by reallocating a subset of the resources among the master communication device, one or more slave communication devices, or both; and
 controlling the base station to assemble and transmit messages that include said allocation of said communication resources.

9. The method according to claim 8 further comprising controlling the base station to rotate through said plurality of wireless communication devices that form said device-to-device group for selection of a member of the group as the master communication device.

10. The method according to claim 8 wherein said communication resources are selected from:
 an upper limit for transmitter power levels for said direct device-to-device communications,
 a time slot in a time division duplex communication mode for said direct device-to-device communications,
 information to synchronize said plurality of wireless communication devices, and
 at least one of a modulation and coding characteristic for said direct device-to-device communications.

11. An apparatus comprising:
 at least one processor; and
 at least one memory including computer program code
 the at least one memory and the computer program code configured to, with the at least one processor, cause the apparatus to perform at least the following:
 in response to selection of a master communication device by a base station, wherein the master communication device is a communication device belonging to a device-to-device group comprising a plurality of wireless communication devices and wherein remaining wireless communication devices belonging to the group are designated as slave communication devices, and wherein the slave devices operate under conditions specified by the master communication device, performing at least the following for the master communication device:
 receive from the base station an allocation of data communication resources for said device-to-device group, wherein the data communication resources facilitate direct device-to-device communications among the master communication device and the slave communication devices belonging to the group;
 dynamically allocate the data communication resources at least by reallocating a subset of the data communication resources among the master communication device, the at least one slave communication device, or both; and
 assemble and transmit messages that include said allocation of said communication resources.

12. The apparatus according to claim 11 wherein the at least one memory and the computer program code further configured to, with the at least one processor, cause the apparatus to periodically assess at least one operating characteristic and periodically reallocate said communication resources as a function thereof.

13. The apparatus according to claim 12 wherein said operating characteristic includes a separation distance between wireless communication devices belonging to said plurality of wireless communication devices.

14. The apparatus according to claim 11 wherein selection of said master communication device is rotated between said plurality of wireless communication devices that form said device-to-device group by a base station.

15. The apparatus according to claim 11 wherein said apparatus further comprises a receiver configured to receive said allocation of communication resources for said device-to-device group and a transmitter configured to transmit said messages including said allocation of communication resources for at least one device in said device-to-device group.

16. The apparatus according to claim 11 wherein said communication resources comprise at least one of:
   an upper limit for transmitter power levels for said direct device-to-device communications,
   a time slot in a time division duplex communication mode for said direct device-to-device communications,
   information to synchronize said plurality of wireless communication devices, and
   at least one of a modulation and coding characteristic for said direct device-to-device communications.

17. A non-transitory computer-readable medium storing a program of instructions, execution of which by a processor configures an apparatus to at least:
   in response to selection of a master communication device by a base station, wherein the master communication device is a communication device in a device-to-device group comprising a plurality of wireless communication devices, wherein remaining devices in the group are designated as slave communication devices, and wherein the slave communication devices operate under conditions specified by the master communication device, performing at least the following by the master communication device:
   receive from the base station an allocation of data communication resources for said device-to-device group, wherein the data communication resources facilitate direct device-to-device communications among the master communication device and the slave communication devices belonging to the group;
   dynamically allocate the data communication resources at least by reallocating a subset of the data communication resources among the master communication device, the slave communication devices, or both; and
   assemble and transmit messages that include said allocation of said communication resources.

18. A method comprising:
   in response to selection of a master communication device by a base station, wherein the master communication device is a communication device in a device-to-device group comprising a plurality of wireless communication devices, wherein remaining devices in the group are designated as slave communication devices, and wherein the slave communication devices operate under conditions specified by the master communication device, performing at least the following by the master communication device:
   receiving from the base station an allocation of data communication resources for said device-to-device group, wherein the data communication resources facilitate direct device-to-device communications among the master communication device and the slave communication devices belonging to the group;
   dynamically allocating by the master communication device the data communication resources at least by reallocating a subset of the data communication resources among the master communication device, the slave communication devices, or both; and
   assembling and transmitting messages that include said allocation of communication resources.

19. The method according to claim 18 wherein said communication resources comprise at least one of:
   an upper limit for transmitter power levels for said direct device-to-device communications,
   a time slot in a time division duplex communication mode for said direct device-to-device communications,
   information to synchronize said plurality of wireless communication devices, and
   at least one of a modulation and coding characteristic for said direct device-to-device communications.

* * * * *